3,473,733
Patented Oct. 21, 1969

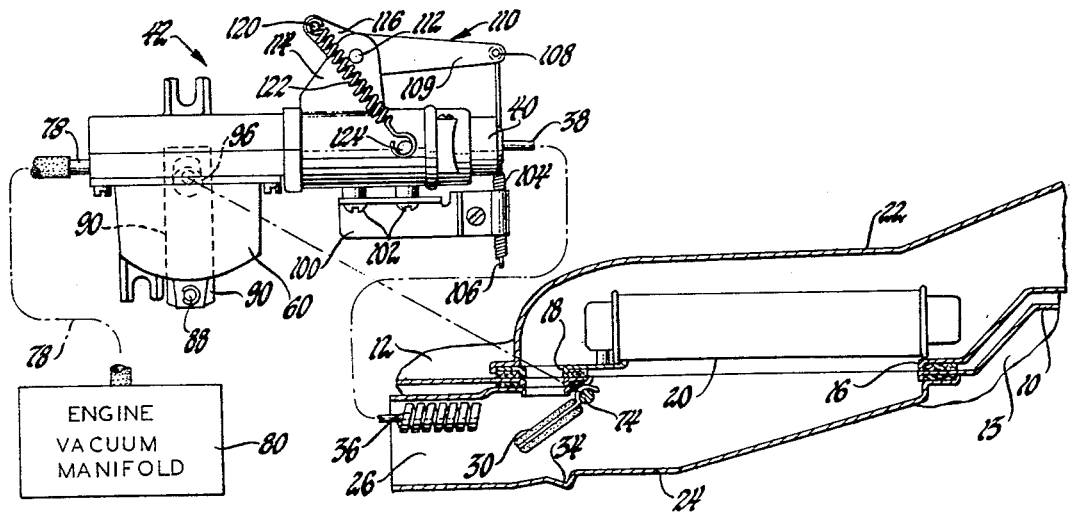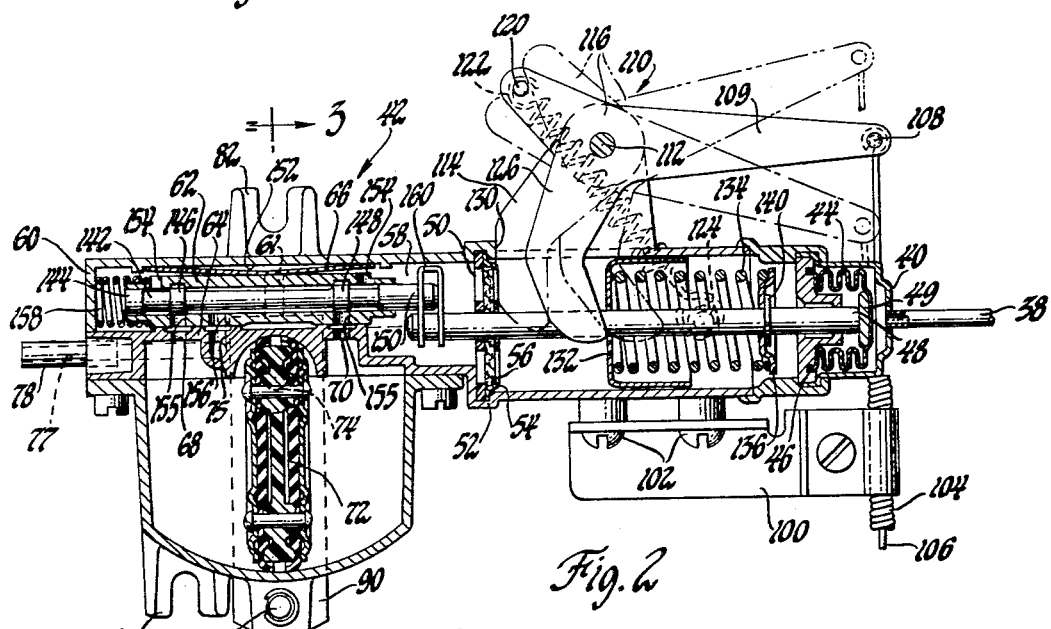

1

3,473,733
SERVO CONTROL SYSTEM FOR
AUTOMOTIVE VEHICLES
Arthur T. Bassett, Jr., Cleo E. Cook, and Thomas C.
Shuler, Dayton, Ohio, assignors to General Motors
Corporation, Detroit, Mich., a corporation of
Delaware
Filed Oct. 11, 1967, Ser. No. 674,565
Int. Cl. G05d *11/16;* F15b *15/12, 13/042*
U.S. Cl. 236—13                                    3 Claims

ABSTRACT OF THE DISCLOSURE

A position servo system in which movement of a controlled element such as a damper in accordance with a variation in a condition will effect a corresponding movement of a vacuum operated motor to compensate for the variation, the feedback from the controlled element to the motor being such that a change in the degree of vacuum has no objectionable effect on the action of the motor or the desired sensitive positioning of the controlled element to gain or maintain the condition such as a temperature in an automobile passenger compartment.

This invention relates to a control for a heating or air conditioning system and more particularly to a servo control operated by vacuum to position a controlled element such as a damper in accordance with a variation in a condition such as temperature in a passenger compartment.

Heretofore a controlled element such as a proportioning damper has been suitably operated by vacuum regulated or modulated to a degree or to an extent in accordance with a variation in a condition for which correction is to be made by movement of the controlled element. Friction and feedback problems have made it difficult, however, to achieve automatic operation with accuracy of control and changes of vehicle speed often affects the degree of vacuum available at the engine intake manifold thus further contributing to a lack of sensitivity in control. An example of a vacuum control found to be satisfactory is disclosed in the United States Patent 3,319,888, granted May 16, 1967, in the name of John E. Creager. Although satisfactory, variations in the vacuum supply serving the control motor in the Creager teaching often occur such as during vehicle acceleration and it is desirable to gain a more accurate control not appreciably affected by variations in vacuum. A thermostatically controlled vacuum motor for operating a damper by vaccum is shown in the United States patent to Hans 2,304,642 but the Hans arrangement is slow in correcting a temperature variation despite the fact that it is faster than is the case with a direct mechanical connection between the damper and a thermostat.

An object of the present invention is to provide an improved automatic control of an element such as a damper and which control is operable by a vacuum in a manner accurately responsive to a condition such as temperature to compensate for a variation in that condition and despite changes in the degree of vacuum available.

A feature of the present invention is a servo control system in which a control element such as a damper is arranged to affect a condition such as temperature, a vacuum motor, balanced against changes in vacuum, being utilized to control the element in accordance with a variable condition, the movements of the control element being directly related to the condition as modified by the control element.

2

This and other important features of the invention will now be described in detail in the specification and then pointed out more particularly in the appended claims.

In the drawings:

FIGURE 1 is a diagrammatic view, partially in section, of a fire wall arrangement in an automobile having ducting for admitting air to a passenger compartment and a control system associated therewith in accordance with the present invention;

FIGURE 2 is a sectional view of a motor element shown in FIGURE 1 but drawn to a larger scale; and FIGURE 3 is a sectional view turned 90 degrees but looking in the direction of the arrows 3—3 of FIGURE 2.

A fire wall 10 is shown in FIGURE 1 as dividing an engine compartment 12 from the passenger compartment 13. The fire wall is apertured as at 16 and 18. The aperture 16 is the larger one and it is traversed by a core 20 of a heater installed in an incoming air duct 22 on the forward or engine compartment side of the firewall 10. The aperture 18 is small than the aperture 16 and is so placed that air may pass around the core 20 and into an inner duct 24 for discharge at 26 into the passenger compartment 13 without being substantially affected by the heater core 20.

A control element in the form of a damper 30 is pivotally mounted within the ducting 24 so that in one angular position it may close off the aperture 18 and in another angular position it may close off passage from through the core 20 by engaging a shoulder 34 of the duct 24. If the damper 30 is placed in an intermediate position as shown in FIGURE 1, it will be seen that unheated and heated air will be mixed in proportions such as to satisfy predetermined temperature requirements of the passenger compartment 13.

A temperature sensitive coil or bulb 36 is mounted in the air discharge end 26 of the ducting 24 and this coil is connected by a capillary tube 38 to an end casing 40 of a vacuum motor generally indicated at 42. End casing 40 encloses a bellows casing 44 which is adapted to expand upon rising temperature in the passenger compartment and contract when the temperature in that compartment lowers. The bellows is sealed at one end to a partition 46 which serves as a journal for one end of a shaft 48 in turn abutting one end portion 49 of the bellows 44. The other end of the shaft 48 is slidable in a spider 50 fixed in a casing portion 52 and the latter is provided with a retaining disk 54 so that an air filter 56 is held in position to clean any air entering through the spider 50 into a valve chamber 58 of a valve casing portion 60. Slidably located within the valve chamber 58 is a valve sleeve or block 62 and the latter is urged downwardly against a valve surface 64 by means of an arched leaf spring 66. The valve surface 64 is ported as at 68 and 70 for the admission of atmospheric air to one side or the other of a vane 72. The latter is fastened to a short shaft 74 which is journaled within a boss 76 of the motor casing portion 60. The surface 64 is also provided with a third port 75 which is connected by means of a passage 77 to a vacuum line 78 leading to an engine vacuum manifold 80. The casing portion 60 has two prong structures 82 and 84 by means of which the vacuum motor 42 may be mounted on a suitable support. A pin 88 is fixed to the casing portion 60 to serve as a pivot for an arm 90 which extends upwardly and is bent over at 90 degrees to enter a slot 92 in the motor casing for engagement with a groove 61 in the valve sleeve 62. The arm 90 bears an elongated aperture 94 permitting rotation of an eccentric 96 fastened to the shaft 74 in the construction shown in FIGURE 3. Shaft 74 also serves as a support for the damper 30 but it will be appreciated that the linkage between the vane 72 and the damper 30 may take other forms without departing from the spirit of the present invention.

A bracket 100 is fastened by means of screws 102 to the casing of the motor 42 and serves to hold a conduit 104 guiding a Bowden wire 106 which may be manually operated as a "push-pull" element from the instrument panel as will be understood. One end of the wire 106 is fastened to a pin 108 joining two parallel plates 109 constituting a three-arm lever 110. The two plates 109 are spaced by two cylinders 109A and 109B (FIGURE 3) and the entire lever 110 is pivoted on a pin 112 held in two brackets 114 integral with the casing portion 52. Two short arms 116 on the lever 110 bear a pin 120 and this pin serves to retain one end of each of two springs 122. The other ends of the springs are fastened such as at 124 to the motor casing in such a way that the springs tend to move the lever 110 in a counterclockwise direction. Depending and bent arms 126 on the lever 110 extend into an aperture 130 (FIGURE 2) of the motor casing and engage one side of a cup 132 surrounding the shaft 48 and slidable within the casing. A spring 134 is held between the bottom of the cup 132 and a disc 136 retained on the shaft 48 against a shoulder 140.

A piston 142 with four lands 144, 146, 148 and 150 is slidable in a bore 152 of the sleeve 62 and is adapted to control two top ports 154 and three bottom ports 155, 155 and 156. A spring 158 acts against the sleeve 62 urging it to the right. A coupling 160 joins the piston 150 to the rod 48.

In the operation of the control system, it being assumed that the spring 134 is loaded to attain a predetermined temperature in the passenger compartment 13, an increase in that temperature, as sensed by the coil 36, will cause the actuating rod or shaft 48 to move to the right as the bellows 44 expands. A decrease in that temperature will cause the shaft 48 to move to the left. The balance springs 122 tend to neutralize the force of the spring 134 and maintain the load on the manual temperature adjusting wire 106 at a minimum.

With a variation in temperature in the passenger compartment 13, the piston 142 will move with the shaft 48 through the coupling 160 in such a way as to provide for an axial translation of motion while allowing for some lateral and angular misalignment of the piston 142 and the shaft 48. The motor vane 72 is directly coupled to the air mix damper 30 and as the vane 72 rotates clockwise or toward the "heat" position, a greater percentage of supplied air is moved through the heater core 20 by the customary blower action or ram effect. This raises the discharge air temperature at 36.

With the control set at a given temperature and with no change of that temperature occurring at 26, the motor vane 72 will assume a corresponding intermediate position as in FIGURE 2. A rise in temperature at 26 due to a reduction in cooling capacity if an air conditioning evaporator is located in the air duct system or an increase in the heating load will cause the damper 30 to move toward the compensating or "cool" position (counterclockwise in FIGURE 1) tending to maintain a constant discharge air temperature at 26.

The action of the motor 42 and the servo arrangement is effectively brought about by vacuum regardless of a possible variation in the degree of vacuum available from the engine intake manifold 80. Vacuum is constantly applied between the piston lands 146 and 148 through the vacuum supply line 78 and the ports 75 and 156. Atmospheric pressure is applied to the outside of each of the piston lands. If the piston moves to the left due to a decrease in temperature at 26, the left side of the vane 72 will be opened to vacuum and the right side to atmospheric pressure. This pressure differential causes the vane 72 to move clockwise and permits more air to pass through the heater core 20. If the sleeve 62 were stationary, as the piston 142 moved to the left the vane 72 would move clockwise without regard to the amount of piston travel. The travel of the vane 72 is made proportional to the piston travel by means of the arm 90 and the cam 96. The cam, being eccentric to the axis of the shaft 74 translates linear motion to the sleeve 62 by means of the arm 90. As the piston 142 moved to the left the vane 72 would move clockwise and this causes the sleeve 62 to move to the left. This in turn locates the piston 142 over the air intake ports 68 and 70 in such a way as to equalize the pressures exerted on the vane 72. In this way further vane motion is stopped with the spring 158 urging the sleeve 62 to the right and holding the arm 90 against one side of the cam 96. The cam 96 works against the spring 158 in moving the sleeve 62 to the left and this eliminates back lash motion. The spring 66 maintains a sliding seal relation between the sleeve or block 62 and the surface 64 and the filter 56 prevents large dust particles from adversely affecting the seal.

We claim:
1. A servo system for controlling the temperature of a vehicle passenger compartment, said system comprising a proportioning damper arranged to mix air at different temperatures prior to entering into said compartment, a source of vacuum, a vacuum motor including an oscillatable vane operable by vacuum and air pressure applied thereto, valve means balanced against atmospheric pressure and controlling the flow of vacuum from said vacuum source and atmospheric air to said vacuum motor, said valve means including a sleeve and a landed piston, said motor being connected to said damper for operating the latter, servo means connecting said damper to said valve means and including an eccentric movable with said damper and an arm connected to said sleeve and arranged to be actuated by said eccentric to move said sleeve, condition sensing means sensitive to the temperature in said compartment and connected to said piston to move the latter within said sleeve, spring means opposing the action of said sensing means on said piston, and manually operable means for varying the loading of said spring means.

2. A servo control system comprising: a vacuum source; a controlled element arranged to affect a condition; a vacuum motor connecting said vacuum source to said element to drive the latter; valve means connecting said source to said motor; condition sensing means operably connected to said valve means; servo means connecting said valve means to said controlled element whereby movement of the latter and said valve means are urged to correspond; said servo means including a valve spring; a sleeve movable by said servo means against said valve spring and a piston having lands and movable by said condition sensing means in said sleeve; said vacuum motor having a casing defining a vacuum passage connecting said vacuum source to an intermediate portion of said piston between two of said lands; and other passages in said casing controlled by said lands and leading from said vacuum motor to the atmosphere.

3. A servo valve system for controlling the temperature of a vehicle passenger compartment comprising: a vacuum source; a damper arranged to mix warm and cool air prior to entering said passager compartment; a vacuum motor including an oscillatable vane which is connected to said damper for rotational movement together; valve means communicating said vacuum source to said vacuum motor for alternately directing vacuum against either side of said vane to pivot said vane and said connected damper; said valve means including a movable sleeve and a piston supported for reciprocation within a bore in said sleeve; annular spaced lands on said piston; a vacuum passage within said sleeve bore and between said lands; a vacuum inlet port through said sleeve to said vacuum passage; air inlet ports through said sleeve for communicating said vacuum passage with the sides of said vane and normally blocked by said piston lands; temperature sensing means for moving said piston within said sleeve in response to a temperature change in the passenger compartment which movement exposes one air inlet port to atmospheric pressure and the other air inlet port to vacuum causing said vane and connected damper to pivot and alter the proportion of warm and cool air entering the passenger compartment; servo means for transmitting damper movement to said valve sleeve to position said sleeve with respect to said piston and said piston lands so as to cause said piston lands to cover said air inlet ports.

References Cited

UNITED STATES PATENTS

| | | |
|---|---|---|
| 2,353,692 | 7/1944 | Cunningham. |
| 2,609,806 | 9/1952 | Winkler _____ 123—127 |
| 2,616,448 | 11/1952 | Werey _____ 137—656 |
| 2,752,891 | 7/1956 | Farkas _____ 165—36 X |
| 3,315,730 | 4/1967 | Weaver et al. _____ 165—23 |

WILLIAM E. WAYNER, Primary Examiner.

U.S. Cl. X.R.

165—36; 236—86